Patented Apr. 24, 1928.

1,667,312

UNITED STATES PATENT OFFICE.

HERMANN FRITZSCHE, EDUARD KRUMMENACHER, HANS GUBLER, AND OTTO KAISER, OF BASEL, SWITZERLAND, ASSIGNORS TO SOCIETY OF CHEMICAL INDUSTRY IN BASLE, OF BASEL, SWITZERLAND.

AZODYESTUFFS AND PROCESS OF MAKING SAME.

No Drawing. Application filed December 21, 1923, Serial No. 682,107, and in France January 9, 1923.

The present invention relates to a new class of azo-dyestuffs, which is characterized by the presence of at least one cyanuric acid ring in the molecule of the dyestuff. It comprises the new class of azo-dyestuffs, the process of preparing same, as well as the material dyed with the new dyestuffs.

It has been found that a new class of azo-dyestuffs can be obtained by choosing the parent materials adapted for the synthesis of azo-dyestuffs in such a manner that at least one of the parent materials contains at least one cyanuric nucleus.

The process is carried out in such a manner, that at the diazo- and coupling-reaction at least one component is employed which contains the cyanuric nucleus, or that a cyanuric halide is condensed with such components which have reactive hydrogen atoms attached to an oxygen, sulphur, or nitrogen atom, of which components at least one contains the azo-group. The azo-dyestuffs containing the cyanuric nucleus thus obtained can, if necessary, be subjected to further treatment.

Under cyanuric halides there are to be understood not only the cyanuric trihalides alone, but also those products which are obtained from same by a partial substitution of their halogen atoms by compounds having mobile hydrogen atoms, as for example water, hydrogen sulphide, aliphatic and aromatic hydroxyl compounds and mercaptans, ammonia, its mono- and dialkyl, aryl, and acidyl derivatives, and the like.

Such products have been described in the U. S. Patents Nos. 1,625,530, 1,625,531, 1,625,532 and 1,625,533, all of July 20th, 1923.

The dyestuffs thus obtained correspond with the general formula

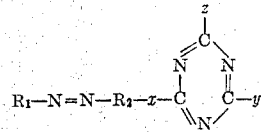

wherein $R_1$ and $R_2$ represent aromatic nuclei which may carry any substituents, such as, among others, halogens, sulpho-, hydroxy-, amino-, nitro-groups, furthermore azo-chromophores and cyanuric nuclei, and wherein $x$ is one of a group of connecting links consisting of N, O or S, and wherein $y$ and $z$ are one of a group of metalloids comprising O, S, N and Cl which may be linked to other atoms which can further be linked to azo-chromophores and cyanuric nuclei.

The new dyestuffs form powders more or less intensively colored, dissolving in water to solutions of all possible colors, i. e. of all colors of the spectrum—yellow, orange, red, violet, blue and green—and of those which are obtained by combination of the said colors, such as bordeaux, brown, grey or black, and dyeing the textile fiber similar tints.

According to the choice made in the components, dyestuffs are obtained which are suitable for all lines of application for which azo-dyestuffs are adapted, as for example, acid wool dyestuffs, mordant dyestuffs, direct cotton dyestuffs, cotton dyestuffs which can be after-treated on the fibre, dyestuffs which can be produced on the fibre, pigments, and the like.

The following general formula has been adopted to facilitate the classification—

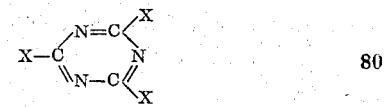

X being a halogen atom or the radical or complex for which it has been exchanged; hereinafter letter $A_1$, $A_2$ or $A_3$ is substituted for X according to the properties which are dependent upon X.

$A_1$ indicates an aminonaphthol or a substitution product thereof.

$A_2$ represents any radical other than that of aminonaphthol having atomic groupings which make it suitable either by diazotization or by coupling or by both for taking active part in the formation of an azo-dyestuff; for instance $NR_1R_2$ ($R_1$ and $R_2$ being H, alkyl or aryl), OH, an active methylene group or the like.

$A_3$ represents any radical or atom not suitable for taking an active part in the formation of a dyestuff by coupling or by diazotization but adapted for carrying one or more atoms or groupings which can play a principal part in the tinctorial qualities of the dyestuff, for example $NR_1R_2$ ($R_1$ and $R_2$ being H, alkyl, aryl or acidyl); O—R, S—R, (R being H, alkyl, aryl or acidyl), Cl, NO$_2$, COOH, CH$_3$, SO$_3$H or the like.
For further facilitating the classification, the dyestuffs are subdivided according to the intermediate products which can be derived according to the foregoing.
The types are as follows:
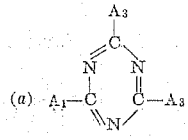 such as 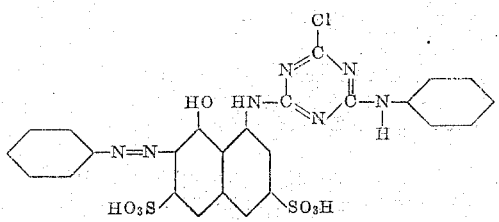
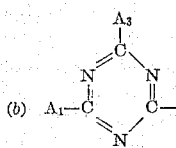 such as 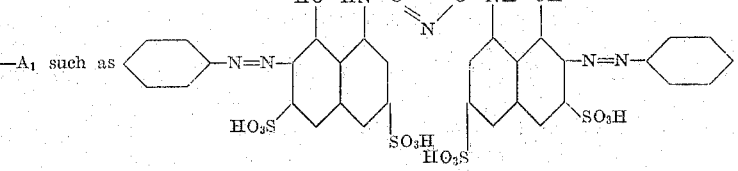
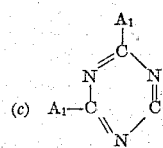 such as 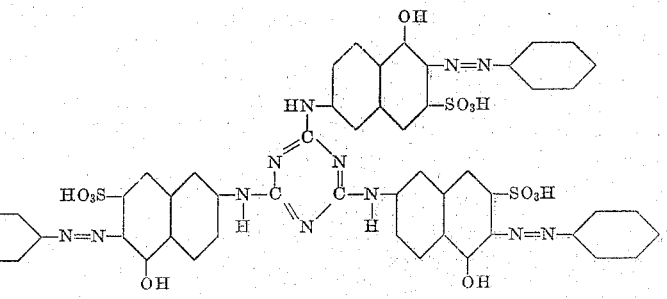
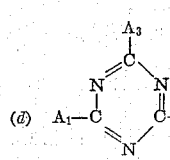 such as 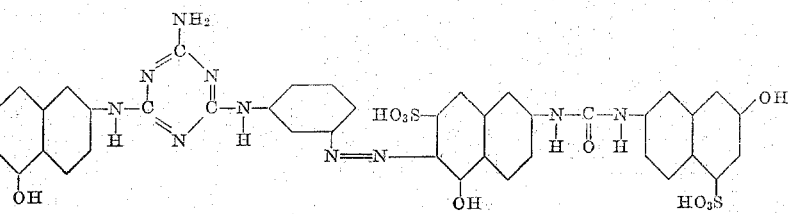
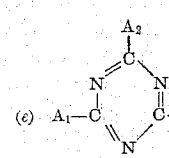 such as 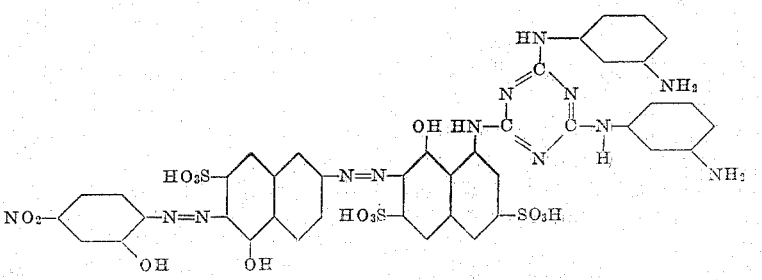

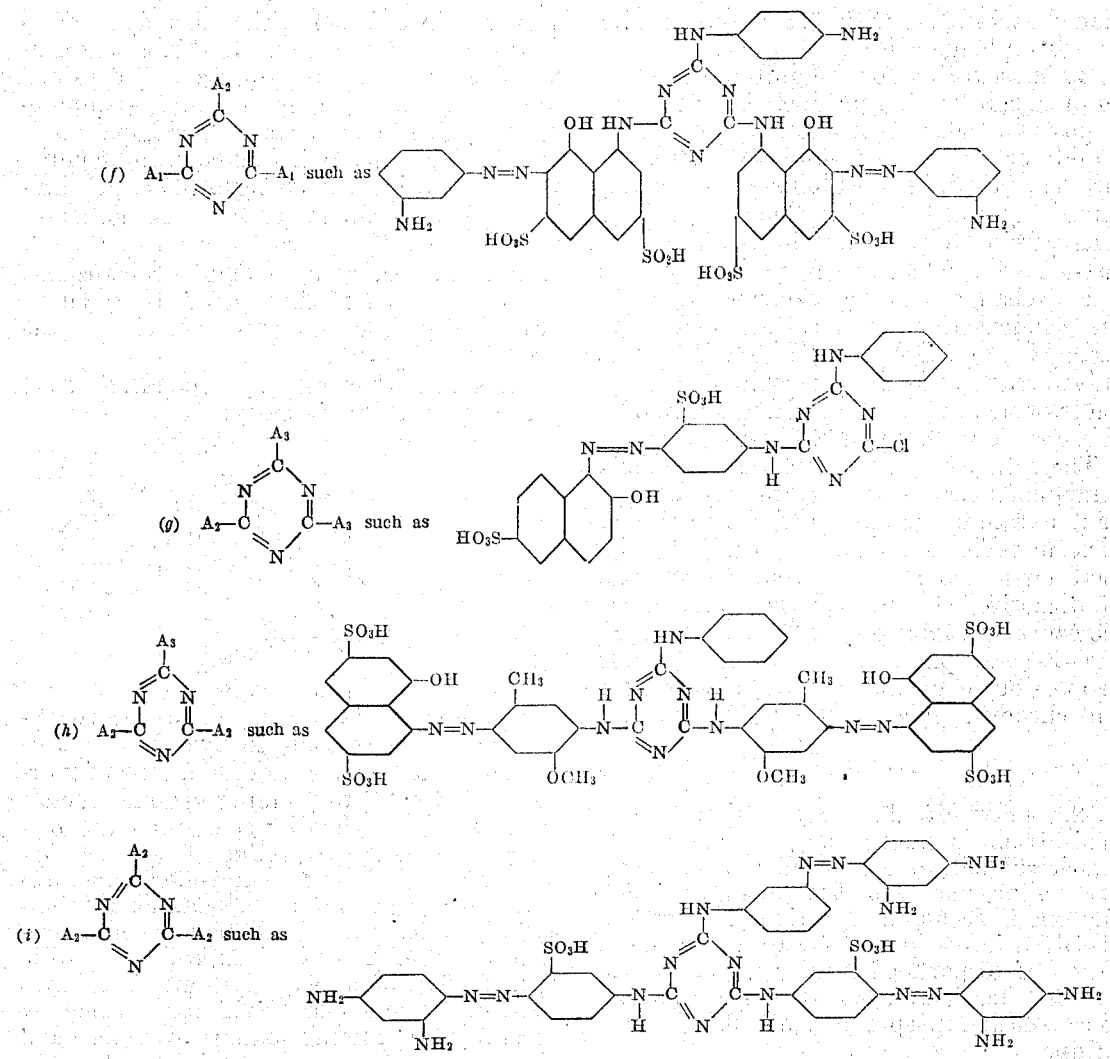

The examples hereinafter given illustrate the invention. They indicate the numerous combinations which fall within it and the important industrial bearing which the products comprised in all these classes of dyestuffs have. It is to be understood, however, that the invention is not limited by the examples, or by the possibilities presented by the combinations and reactions described or mentioned.

1.

*Dyestuffs derived from intermediate products containing aminonaphthol residues.*

(*a*). Dyestuffs derived from intermediate products of type *a*,

Example 1.

46.7 parts of the primary product of condensation obtained from one molecular proportion of cyanuric chloride and one molecular proportion of 1:8-aminonaphthol-3:6-disulphonic acid are dissolved in 350 parts of water with aid of 15 parts of anhydrous sodium carbonate; to the solution are added in succession ice and a diazobenzene solution prepared from 9.3 parts of aniline. The dyestuff thus formed corresponding most probably with the formula:

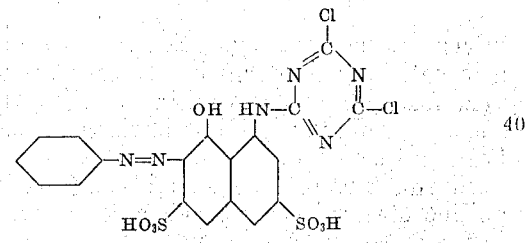

is precipitated by common salt. It dyes wool rose tints, very pure.

The same dyestuff is obtained by action of one molecular proportion of cyanuric chloride on one molecular proportion of the dyestuff obtained by combining in alkaline solution diazobenzene with 1:8-aminonaphthol-3:6-disulphonic acid.

By substituting for the aniline in this example a substitution product thereof having a positive substituent, for instance paratoluidine or 2-amino-5-dimethylamino-4'-methyl-1:1'-diphenyl-sulphone, there are obtained dyestuffs notably more violet and even passing to pure blue in the case of the last-named product, while the total or partial exchange of the chlorine atoms in the condensation product for OH, NH$_2$, NHC$_2$H$_5$, N(C$_2$H$_5$)$_2$ or NHCOCH$_3$ groups only changes little the properties of the dyestuffs, which generally speaking are remarkably fast to washing and to light.

The orthohydroxy or orthocarboxy diazo-compounds lead to the formation of mordant dyestuffs which can give rise to complex metallic combinations, thus the dyestuff made from one molecular proportion of diazotized 4-nitro-2-amino-1-phenol, one molecular proportion of 1:8-amino-naphthol-3:6-disulphonic acid and one molecular proportion of cyanuric chloride when dyed and chromed on wool yields green tints.

*Example 2.*

52.3 parts of the condensation product made from one molecular proportion of cyanuric chloride, one molecular proportion of 1:8-amino-naphthol-3:6-disulphonic acid and one molecular proportion of aniline are dissolved in 350 parts of water with the addition of 15 parts of anhydrous sodium carbonate. Ice is added and then a diazobenzene solution prepared from 9.3 parts of aniline.

There is formed immediately a dyestuff corresponding most probably with the formula:

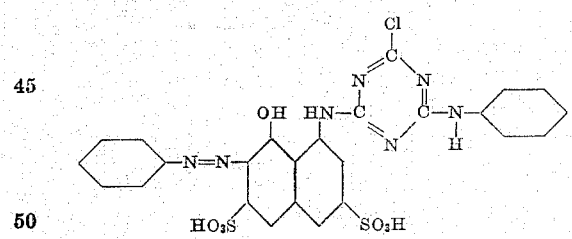

which can be salted out. It dyes wool in an acid bath rose tints which are very pure and very fast to light and washing. It also dyes cotton, preferably in an acetic acid bath, beautiful rose tints.

In this example by substituting for the aniline a substitution product thereof having a negative substituent, for instance Cl, COOH or SO$_3$H, there are obtained similar tints, while the dyestuffs made from the toluidines, the aminoacidylanilides, the anisidines and the naphthylamines range from blood red to violet.

Blue to greenish-blue dyestuffs are further obtained if an amino azo dyestuff is chosen as diazo-component. Thus a greenish-blue dyestuff fast to light is obtained with 4'-nitro-2'-sulpho-2-methyl-4-amino-5-methoxy-1,1'-azobenzene. Analogous products are obtained if in the coupling component the aniline is exchanged for other similar radicals, as for instance 1.4-aminoacetanilide.

As in the preceding example, substitution of the last atom of chlorine of the cyanuric group by NH$_2$ or OH does not change the tint of the dyestuff.

Thus the dyestuff corresponding most probably with the formula:

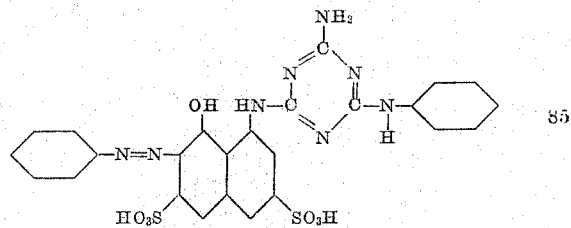

dyes cotton also pink shades.

The use of orthohydroxy or orthocarboxy-diazo-compounds leads to dyestuffs capable of being fixed on the fibre by means of mordants or capable of yielding complex metallic compounds; thus by combining the primary condensation product from one molecular proportion of cyanuric chloride, one molecular proportion of 1:8-aminonaphthol-3:6-disulphonic acid and one molecular proportion of aniline with diazotized anthranilic acid, there is obtained a dyestuff which dyes wool in an acid bath vivid rose, which by subsequent chroming passes to violet and yields by coppering a very violet red.

*Example 3.*

There is prepared an alkaline solution containing 104.7 parts of the secondary condensation product obtained from one molecular proportion of cyanuric chloride, one molecular proportion of 1:8-aminonaphthol-3:6-disulphonic acid and one molecular proportion of aniline in 700 parts of water with the aid of 40 parts of anhydrous sodium carbonate; to this solution is added a tetrazodiphenyl solution prepared from 18.4 parts of benzidine. There is formed a dyestuff which dyes cotton in an alkaline bath blue tints. Dyestuffs of analogous properties are obtained by using instead of benzidine another derivative of para-para'-diaminodiphenyl or a diazo-derivative thereof obtained by coupling the corresponding tetrazo-derivative with a molecular proportion of any component; for instance the product obtained by coupling one molecular proportion of tetrazodiphenyl with one molecular proportion of 1:8-aminonaphthol-3:6-disulphonic acid and then, in the second place, with one molecular proportion of the secondary product of condensation mentioned above, also gives a blue dyestuff.

Example 4.

The diazo-compound prepared in the usual manner from 17.3 parts of 1-aminobenzene-2-sulphonic acid is introduced into a solution of 58.3 parts of the secondary condensation product from one molecular proportion of cyanuric chloride, one molecular proportion of 1:8-aminonaphthol-3:6-disulphonic acid and one molecular proportion of para-aminosalicylic acid in presence of an excess of sodium carbonate. There is obtained a red dyestuff, which, when printed on cotton with the aid of chrome mordants, yields very pure red of very good fastness. The same dyestuff dyes wool in an acid bath vivid bluish red tints, which when chromed on the fibre become very fast to fulling and fast to potting without perceptibly losing in vividness.

Mordant dyestuffs of analogous properties but the tints of which may range to violet are obtained by substituting for the 1-aminobenzene-2-sulphonic acid another diazo-component, such as aniline, a toluidine, a xylidine, an anisidine, a phenetidine, or a halogen, carboxyl, sulphonic or aminoacidyl derivative of one of them, or a product containing two or more of these substituents, or a naphthylamine or a sulphonic acid thereof, or a more complicated amine like amino-azobenzene, a homologue or substitution product thereof, or a diazo-compound containing in addition either a cyanuric nucleus or a residue of salicylic acid, or a homologue or a substitution product thereof, or these residues together.

Furthermore, dyestuffs of the same properties may be obtained by exchanging the para-aminosalicylic acid for another substance having the grouping of salicylic acid or benzoic acid, such as a sulpho-, chloro- or nitroaminosalicylic acid, an amino cresotinic acid, a corresponding naphthalene derivative or the like, and the last chlorine atom for an OH-, $NH_2$-, $OCH_3$-, NHR- (R=alkyl or acidyl) group. Thus the dyestuff corresponding most probably with the formula:

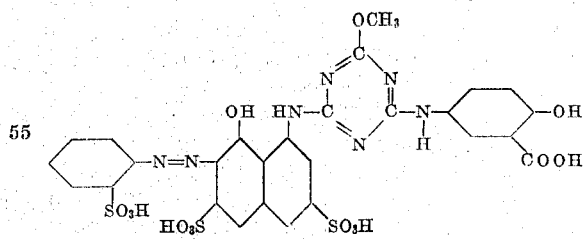

Example 5.

In 350 parts of water are dissolved 15 parts of anhydrous sodium carbonate and 58.3 parts of the ternary product of condensation from one molecular proportion of cyanuric chloride, with one molecular proportion of 1:8-aminonaphthol-3:6-disulphonic acid and two molecular proportions of aniline; ice is added and then the diazo-compound prepared from 10.7 parts of ortho-toluidine. The dyestuff formed is salted out, filtered and dried. It dyes cotton in a bath alkaline with sodium carbonate or acid with acetic acid violet red tints. With barium salts it yields insoluble lakes.

Less bluish-red dyestuffs are obtained by substituting in this example for ortho-toluidine a substitution product of aniline having a negative substituent, while introduction of xylidine, an anisidine or a naphthylamine yields a dyestuff tending more or less to violet.

To this category of dyestuffs belong also those which can be obtained by substituting in the coupling component another primary or secondary amine once or twice for the aniline. If there be used as primary amine once or twice a derivative or homologue of salicylic acid, benzoic acid or phthalic acid, or if there be used as the diazo-component an orthohydroxy or orthocarboxy diazo-compound, or if these two variations be combined there are obtained dyestuffs capable of being dyed or printed with the aid of a mordant or of giving complex metallic compounds.

Thus, the dyestuff obtained by union of diazotized 1-aminobenzene-2-sulpho-5-carboxylic acid and the ternary product of condensation from one molecular proportion of cyanuric chloride, one molecular proportion of 1:8-aminonaphthol-3:6-disulphonic acid and two molecular proportions of para-aminosalicylic acid corresponding most probably with the formula:

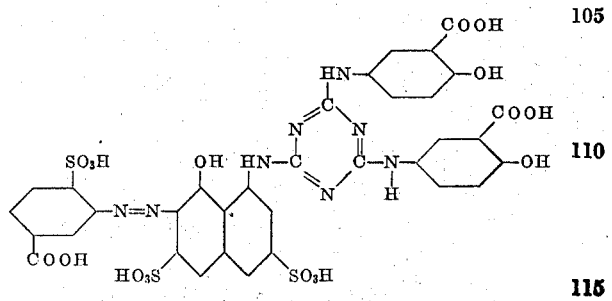

yields, when chrome-printed on cotton, very fast rose tints.

Example 6.

50.1 parts of the ternary product of condensation from one molecular proportion of cyanuric chloride, one molecular proportion of 2-amino-5-naphthol-7-sulphonic acid and two molecular proportions of aniline, are dissolved in 1000 parts of water, mixed with 20 parts of sodium carbonate and 8 parts of caustic soda. There is added to the cold solution the diazo-compound obtained from 18.8 parts of 1-amino-2-hydroxybenzene-5-sulphamide. The dyestuff formed is salted out and filtered. It dyes cotton tints which are sensitive to alkalies and tend towards bordeaux and become fast to alkalies and to light by subsequent treatment with a copper salt. This dyestuff may be given directly bordeaux tints by dyeing in the presence of a salt of copper. It may also be converted in substance, for instance by means of copper sulphate, into a complex combination with copper which dyes, like a direct dyestuff, the aforesaid bordeaux tints.

Obviously, fast dyestuffs may also be synthesized by means of products of condensation of the type (a) derived from 2-amino-5-naphthol-7-sulphonic acid without passing through the coppered compound. To this class belong dyestuffs ranging from bluish-red to blue obtainable by means of aminoazobenzene or its sulphonic acid or a homologue or substitution product thereof, and those dyestuffs in which the products of condensation in question form the last component of tris- and polyazo-dyestuffs corresponding most probably with the formula:

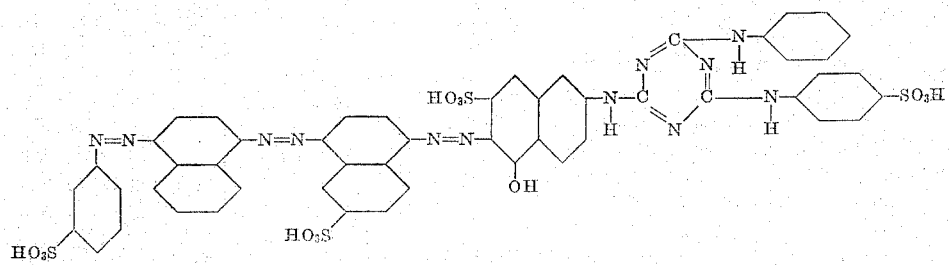

Thus the dyestuff obtained by diazotizing the mono-azo-dyestuff from one molecular proportion of diazotized 1-aminobenzene-3-sulphonic acid and α-naphthylamine and coupling with 1-aminonaphthalene-6-sulphonic acid, diazotizing and coupling with the ternary product of condensation of one molecular proportion of cyanuric chloride, one molecular proportion of 2:5-aminonaphthol-7-sulphonic acid, one molecular proportion of aniline and one molecular proportion of sulphanilic acid is a blue dyestuff fast to light.

(b) Dyestuffs derived from the intermediate products of the type b

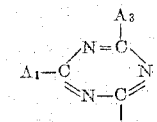

Example 7.

There is prepared a solution containing 75 parts of the secondary condensation product from one molecular proportion of cyanuric chloride and two molecular proportions of 1:8-aminonaphthol-3:6-disulphonic acid, 30 parts of sodium carbonate and 350 parts of water; ice is added and then a diazo-solution obtained from 18.6 parts of aniline. The diazo-dyestuff formed corresponding most probably with the formula:

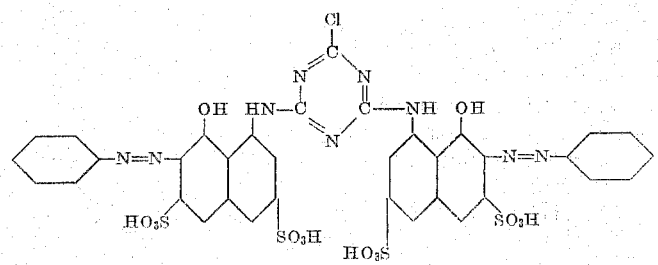

is salted out. It dyes cotton in alkaline solution or acetic acid solution vivid rose tints which are fast to light.

If in this example there are substituted for the two molecular proportions of 1:8-aminonaphthol-3:6-disulphonic acid two molecular proportions of 2:5-aminonaphthol-7-sulphonic acid there is obtained an orange dyestuff; a red cotton dyestuff when two molecular proportions of 2:8-aminonaphthol-1:6-sulphonic acid are used, and a violet red dyestuff when two molecular proportions of 1:8-aminonaphthol-4-sulphonic acid are used. The mixed secondary condensation products obtained by means of the aminonaphthols named above also give red dyestuffs. To this category belong the mono-azo-dyestuffs which can be developed on the fibre with aid of a diazo-compound, such as paranitrodiazobenzene.

For example, 64.9 parts of the ternary product of condensation from one molecular proportion of cyanuric chloride, two molecular proportions of 2:5-aminonaphthol-7-sulphonic acid and one molecular proportion of ammonia are dissolved in 1000 parts of water with aid of 40 parts of anhydrous sodium carbonate and the solution is mixed with a diazo-solution made from 12.3 parts of ortho-anisidine. The monoazo-dyestuff thus formed is salted out. It dyes cotton bluish-red and when the dyeing is treated with diazotized paranitraniline it becomes scarlet, fast to washing. The dyestuff thus formed corresponds most probably with the formula:

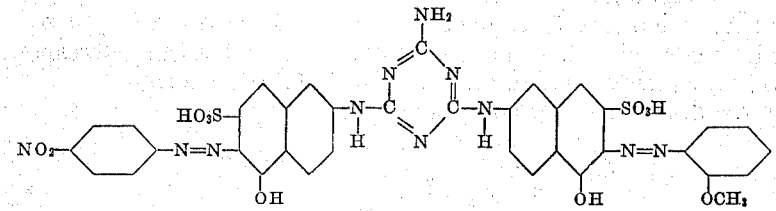

Example 8.

To the dyestuffs from the intermediate products of type (b) belong also those which are obtained by substituting for the last mobile chlorine in the coupling component OH or $NH_2$, or a primary or secondary amine, or an alcohol, a phenol or a naphthol. When there is introduced in this manner into the coupling component the group characteristic of salicylic acid or merely carboxylic groups, or indeed if there is used as diazo-component an orthohydroxy or orthocarboxy diazo-compound, or diazo-compound already containing ortho-hydroxyazo or ortho-ortho'-dihydroxyazo - groups, or if these two variations be used together, there are obtained dyestuffs adapted to be dyed or printed with the aid of mordants or to yield complex metallic combinations.

This statement may be illustrated by the following particular cases.

The ternary condensation product from one molecular proportion of cyanuric chloride, two molecular proportions of 1:8-aminonaphthol-3:6-disulphonic acid and one molecular proportion of aminosalicylic acid yields, when coupled with diazotized anthranilic acid, a bright red dyestuff corresponding most probably with the formula:

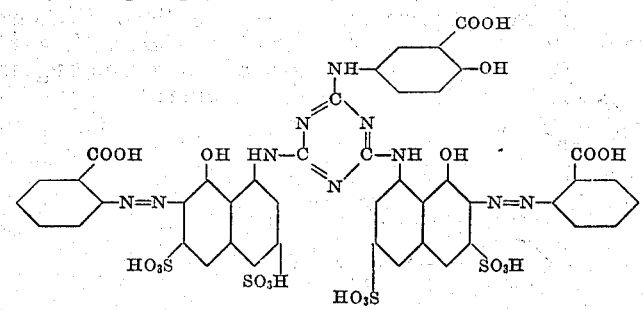

which when printed on cotton with the aid of a chromium mordant yields a beautiful violet lake of very satisfactory fastness to washing, to soaping and to chlorine.

There is obtained a dyestuff yielding red lakes when chrome printed by combining two molecular proportions of diazotized 1-aminobenzene-2-sulphonic acid with one molecular proportion of the di-ternary condensation product made by action of one molecular proportion of paraphenylene-diamino on two molecular proportions of the secondary condensation product from one molecular proportion of cyanuric chloride, one molecular proportion of 1:8-aminonaphthol-3:6-disulphonic acid and one molecular proportion of para-aminosalicylic acid.

37.8 parts of 1-hydroxy-2-aminobenzene-4-sulphonic acid are diazotized in the usual manner and the diazo solution thus obtained is introduced into a solution containing, together with an excess of sodium carbonate, 57.2 parts of the ternary condensation product from one molecular proportion of cyanuric chloride, two molecular proportions of 2:5-aminonaphtholsulphonic acid and one molecular proportion of ammonia. The dyestuff thus obtained, transformed into its copper compound, dyes cotton ruby tints very fast to light.

42.6 parts of the dyestuff made by coupling in alkaline medium one molecular proportion of 2-diazo-5-nitro-1-phenol and one molecular proportion of 2:5-aminonaphthol-7-sulphonic acid are diazotized and introduced cold into a solution made from 1000 parts of water, 50 parts of anhydrous sodium carbonate and 40.5 parts of the ternary condensation product from one molecular proportion of cyanuric chloride, two molecular proportions of 1:8-aminonaphthol-3:6-disulphonic acid and one molecular proportion of aniline. The dyestuff formed is filtered and converted into its copper compound. It dyes cotton very greenish-blue tints, fast to light.

Example 9.

To the dyestuffs derived from the intermediate products of the type b also belongs a series of dyestuffs which may be obtained directly on the fibre; thus one can impregnate or dye the latter with a solution of the di-ternary product obtained by combining two molecular proportions of the primary product made by condensation of one molecular proportion of cyanuric chloride with one molecular proportion of 2:5-aminonaphthol-7-sulphonic acid, with one molecular proportion of metaphenylenediamine and substituting in the di-secondary product thus obtained two aniline residues for the two chlorine atoms, and the fibre thus impregnated or dyed may be passed through a bath of diazotized paranitraniline. The developed dyestuff corresponds most probably with the formula:

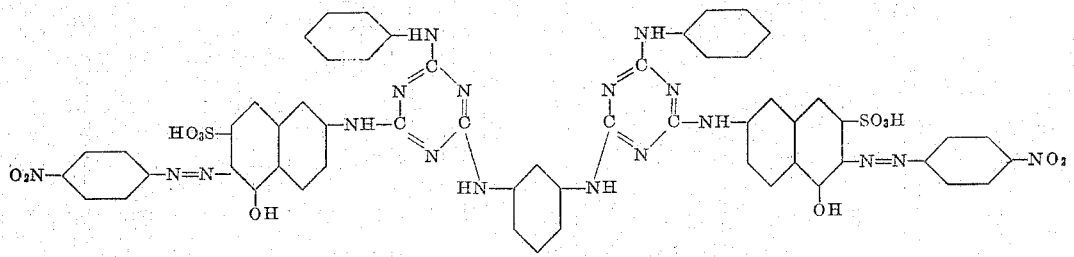

In this manner there is obtained on the fibre an orange scarlet dyeing, fast to washing. The nonsulphonated condensation products obtained, for example by condensing a nonsulphonated aminonaphthol with cyanuric chloride, are particularly suitable for this process of dyeing, particularly if, owing to their constitution, they unite with other groups, as for example with products of type c.

(c) Dyestuffs derived from the intermediate products of type c

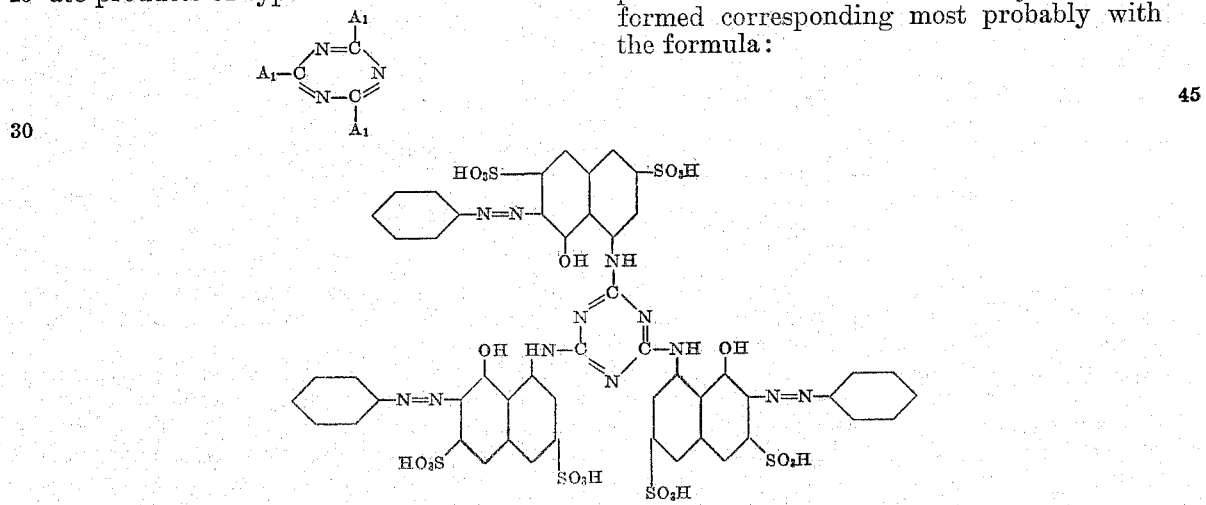

*Example 10.*

A solution made from 103.2 parts of the ternary condensation product from one molecular proportion of cyanuric chloride and three molecular proportions of 1:8-aminonaphthol-3:6-disulphonic acid, 400 parts of water and 45 parts of sodium carbonate is cooled by ice and into it there is introduced the diazo solution obtained from 27.9 parts of aniline. The trisazo-dyestuff thus formed corresponding most probably with the formula:

is isolated in the usual manner. It dyes cotton rose tints.

The analogous dyestuff made from three molecular proportions of diazotized orthoanisidine and one molecular proportion of the ternary condensation product from one molecular proportion of cyanuric chloride and three molecular proportions of 2:5-aminonaphthol-7-sulphonic acid dyes cotton very pure blood red tints.

(d) Dyestuffs derived from intermediate products of the type d

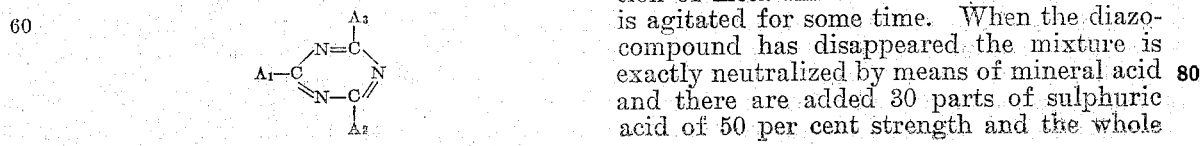

*Example 11.*

12.1 parts of metaxylidine are diazotized in the usual manner and the diazo-solution is introduced into a cold and freshly prepared suspension containing, in addition to an excess of sodium carbonate, 54.5 parts of the ternary condensation product from one molecular proportion of cyanuric chloride, one molecular proportion of 2:5-aminonaphthol-7-sulphonic acid, one molecular proportion of aniline and one molecular proportion of meta-aminoformanilide. The whole is agitated for some time. When the diazo-compound has disappeared the mixture is exactly neutralized by means of mineral acid and there are added 30 parts of sulphuric acid of 50 per cent strength and the whole is heated for some hours at 80–90° C. By saponification of the formyl group the dyestuff corresponding most probably with the formula:—

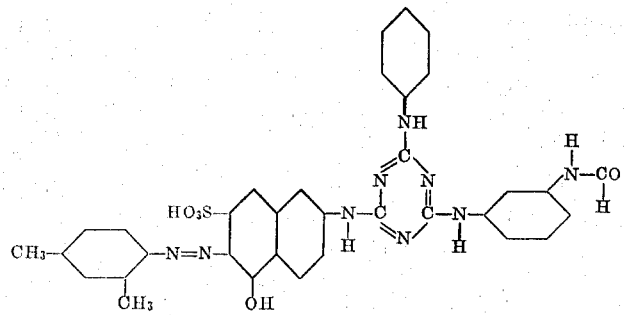

becomes transformed from a derivative of the type $a$

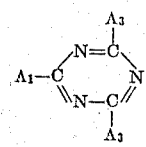

into a derivative of the type $d$

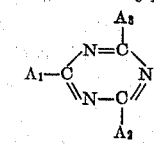

corresponding most probably with the formula:

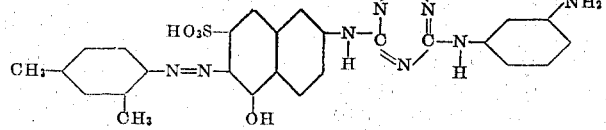

When the saponification is finished the mixture is made alkaline with sodium carbonate and the dyestuff is precipitated completely by means of common salt. It dyes cotton a yellowish red tint which by diazotization and coupling with β-naphthol on the fibre becomes a little more yellow and fast to washing.

The same dyestuff is obtained when instead of the coupling compound mentioned in the preceding paragraph there is used the ternary condensation product from one molecular proportion of cyanuric chloride, one molecular proportion of 2:5-aminonaphthol-7-sulphonic acid, one molecular proportion of aniline and one molecular proportion of metanitraniline, the nitro-group of the dyestuff thus obtained being then reduced, for instance by means of sodium sulphide; or if one treats with metaphenylenediamine or meta-aminoformanilide the dyestuff obtained from diazo-metaxylene and the secondary product of condensation from one molecular proportion of cyanuric chloride, one molecular proportion of 2:5-aminonaphthol-7-sulphonic acid and one molecular proportion of aniline, the formyl group being subsequently saponified if meta-aminoformanilide has been used; or if one treats the dyestuff obtained by combining diazo-metaxylene with the primary condensation product from 2:5-aminonaphthol-7-sulphonic acid and cyanuric chloride and substitutes suitable components for the two chlorine atoms in the dyestuff thus obtained. In this example by substituting 1:8-aminonaphthol-3:6-disulphonic acid for 2:5-aminonaphthol sulphonic acid, dyestuffs which are notably more violet are obtained.

In this example it is also possible to use other diazo-components instead of metaxylene; among these may be named mono-acidyl primary aromatic diamines, monosulphonated naphthylamines, mono-azo-dyestuffs of the type of aminobenzene and its sulphonic acid derivatives which give bluish-red dyestuffs, particularly fast to light, and diamines, such as diaminodiarylmethanes and diaminodiarylureas. If these combinations produce dyestuffs which are too little soluble this can be remedied by transforming them into ω-methyl-sulphonic derivatives as described in the U. S. Patent Specification No. 1,362,936.

*Example 12.*

In 1000 parts of water are dissolved with aid of 5.3 parts of anhydrous sodium carbonate 44.1 parts of the ternary product of condensation from one molecular proportion of cyanuric chloride, one molecular proportion of 2:5-aminonaphthol-7-sulphonic acid, one molecular proportion of ammonia and one molecular proportion of metaphenylenediamine; there are then added successively at 20° C. 6.9 parts of sodium nitrite and 35 parts of hydrochloric acid of 30 per cent strength. There is formed a brown yellow diazo compound which is slightly soluble; this is introduced into a solution of 50.4 parts of the symmetrical urea of 2:5-aminonaphthol-7-sulphonic acid and 45 parts of anhydrous sodium carbonate in 800 parts of water. The mono-azo-dyestuff thus formed is completely precipitated by adding common salt, filtered and dried. It dyes cotton bluish-red tints, not very intense but becoming an intense yellowish red fast to washing by final treatment with diazotized paraniltraniline.

*Example 13.*

A freshly prepared solution of 46.7 parts of the primary condensation product from one molecular proportion of cyanuric chloride and one molecular proportion of 1:8-aminonaphthol-3:6-disulphonic acid is exactly neutralized with sodium carbonate and there is added a solution of 28 parts of sodium para-aminobenzene-azo-salicylate (obtained for example by coupling para-nitrodiazobenzene with salicylic acid, and reducing the nitro-group of the azo-dyestuff thus formed). After agitating for some time 5 parts of anhydrous sodium carbonate are added carefully and the mixture is mildly heated (50° C.) until the para-aminobenzene-azo-salicylic acid has disappeared. The secondary product formed may then be precipitated in the form of a yellow powder by common salt or it may be transformed into a ternary condensation product, for example by adding to the crude solution of the secondary product 15 parts of aniline and agitating for some hours at 90° C. and then expelling the slight excess of aniline by means of steam. On allowing the liquid to cool the ternary condensation product from one molecular proportion of cyanuric chloride, one molecular proportion of 1:8-aminonaphthol-3:6-disulphonic acid, one molecular proportion of para-aminobenzene-azo-salicylic acid and one molecular proportion of aniline is precipitated in the form of small yellow crystals.

By substituting in this example 2:5-aminonaphthol-7-sulphonic acid for the 1:8-aminonaphthol-3:6-disulphonic acid there are obtained secondary and ternary condensation products which are quite analogous.

The same products can be obtained by other methods; for example, by causing the amino-azo-dyestuff to react on the secondary product of condensation from one molecular proportion of cyanuric chloride, one molecular proportion of aminonaphthol and one molecular proportion of aniline; or by synthesizing in the first place the primary product of the azo-dyestuff or of the aniline with cyanuric chloride and then causing it to react in any desired order with the aminonaphthol, the aniline or the azo-dyestuff.

*Example 14.*

77 parts of the ternary condensation product described in the first paragraph of Example 13 are dissolved in 2000 parts of water and 25 parts of anhydrous sodium carbonate; the solution is cooled to 0° C. and there is added the diazo-solution obtained from 9.3 parts of aniline. There is formed a dyestuff which may be isolated in the usual manner and dyes cotton red tints fast to light.

If in this example para-acetylaminodiazobenzene is substituted for the diazobenzene there is obtained a dyestuff which dyes cotton very violet red. By saponifying the acidyl group in this dyestuff (for example by boiling the freshly isolated dyestuff for ¼ hour with a solution of 1000 parts of caustic soda of 10 per cent strength) there is obtained a dyestuff corresponding most probably with the formula:

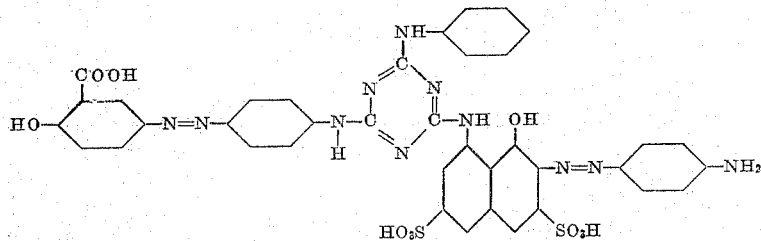

which dyes cotton green and yielding when diazotized and coupled with β-naphthol on the fibre a pure green dyeing, fast to washing.

Valuable green direct azo-dyestuffs are furthermore obtained if the coupling component employed is coupled with diazotized intermediate products which are obtained by uniting a diazotized 1:8-aminonaphthol-sulphonic acid with primary amines of the benzene and naphthalene series, such as cresidine, α-naphthylamine, etc.

There is also obtained a green dyestuff by coupling in alkaline medium 69 parts of the ternary condensation product starting from the 2:5-aminonaphthol-7-sulphonic acid referred to in the second paragraph of Example 13 with the diazo compound prepared from 44.9 parts of the manoazo-dyestuff obtained by combining 2-methoxy-4-acetylamino-5-chloro-1-diazobenzene with 1-aminonaphthalene-6-sulphonic acid and saponifying the acidyl group by boiling with caustic soda of 10 per cent strength. The green tint obtained with this dyestuff may be diazotized on the fibre and developed with β-naphthol. There is thus obtained a blue-green tint, fast to light and washing.

By substituting for the diazo-compound of the preceding paragraph that obtained by diazotizing 56 parts of the diazo-dyestuff; 1-aminobenzene-3-sulphonic acid → α-naphthylamine → 1-aminonaphthalene-5-sulphonic acid, there is obtained also a green dyestuff very fast to light.

Example 15.

69 parts of the ternary condensation product starting from 2:5-aminonaphthol-7-sulphonic acid referred to in the second paragraph of Example 13 are dissolved in 2000 parts of water with aid of 30 parts of anhydrous sodium carbonate and there is added at 10° C. the diazo-compound made in the usual manner from 18.9 parts of 1-amino-2-hydroxybenzene-5-sulphonic acid. The dyestuff isolated in the usual manner dyes cotton dull tints sensitive to the action of acids and alkalies, which tints by treatment with a copper salt become yellowish brown and fast to alkalies and light. The same result is obtained by dyeing in the presence of a copper salt or by transforming the dyestuff according to known methods into the complex copper combination.

The same dyestuff is obtained by operating in the following manner:—

In 2000 parts of water are dissolved 43.9 parts of the monoazo-dyestuff obtained by combining 1-diazo-2-hydroxybenzene-5-sulphonic acid with 2:5-aminonaphthol-7-sulphonic acid and 28 parts of para-aminobenzene-azo-salicylic acid and if necessary sodium carbonate is added until the reaction is neutral. There are then added 18.6 parts of finely subdivided cyanuric chloride and the mixture is stirred until the components have disappeared. There are then added 9.3 parts of aniline and the whole is boiled in a reflux apparatus and when the ternary condensation product has been formed it is salted out. The dyestuff thus obtained is identical with that described in the first paragraph of this example.

A beautiful green dyestuff, very fast to light is obtained by transforming into the copper combination the dyestuff obtained by diazotizing 42.6 parts of the mono-azo-dyestuff made by coupling 5-nitro-1-hydroxy-2-diazobenzene with 2:5-aminonaphthol-7-sulphonic acid and coupling this diazo-compound in alkaline medium with 77 parts of the ternary condensation product starting from 1:8-aminonaphthol-3:6-disulphonic acid described at the end of the first paragraph of Example 13.

(e). Dyestuffs derived from intermediate products of the type e,

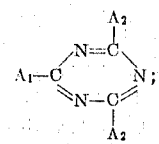

Example 16.

58.8 parts of the ternary condensation product from one molecular proportion of cyanuric chloride, one molecular proportion of 2:5-aminonaphthol-7-sulphonic acid and two molecular proportions of meta-aminoformanilide are dissolved in 1200 parts of water with the aid of 25 parts of anhydrous sodium carbonate and there is added the diazo-compound prepared from 12.1 parts of metaxylidine. The dyestuff formed is saponified in the manner described in the first paragraph of Example 11.

The dyestuff thus obtained corresponding most probably with the formula:

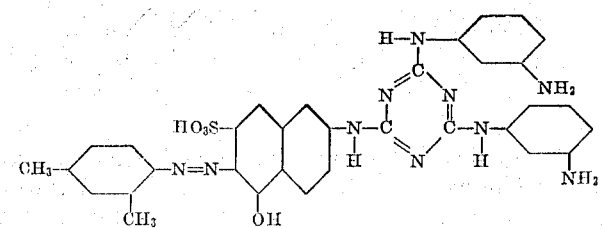

dyes cotton a yellowish red tint, which by diazotization and development with β-naphthol on the fibre becomes somewhat more yellow but notably stronger and faster to washing than that obtained by means of the corresponding dyestuff of the first paragraph of Example 11.

This peculiarity is observed generally in all the dyestuffs which can be diazotized on the fibre described or mentioned in Example 11, in which the inactive component $A_3$ has been exchanged for a componant $A_3$ introducing into the molecule of the dyestuff a second diazotizable amino-group.

Example 17.

Into 3000 parts of water are introduced 96.9 parts of the coppered dyestuff made by combining the primary product from one molecular proportion of cyanuric chloride with one molecular proportion of 1:8-aminonaphthol-3:6-disulphonic acid with the diazo-compound obtained by diazotizing the mono-azo-dyestuff, itself made by combining 5-nitro-1-hydroxy-2-diazobenzene with 2:5-aminonaphthol-7-sulphonic acid and treating the azo-compound with a copper salt; there are added 23.7 parts of metaphenylendiamine and the whole is stirred first cold and then while the temperature is raised very slowly to boiling. Heating is continued for some time at the boiling point and then there is separated in the usual manner a dyestuff in which the mobile chlorine atoms have been exchanged for metaphenylendiamine residues. The dyestuff dyes cotton pure blue which when diazotized and developed on the fibre by means of 1-phenyl-3-methyl-5-pyrazolone becomes a bluish green quite fast to washing and light.

There is obtained a dyestuff yielding directly beautiful green tints fast to light, by substituting in this example for the metaphenylenediamine, para-aminobenzene-azosalicylic acid and purifying by crystallization in presence of common salt the ternary condensation product thus prepared.

Example 18.

Vegetable fibre is impregnated with a solution of 2 per cent strength of the ternary condensation product from one molecular proportion of cyanuric chloride, one molecular proportion of 2:5-aminonaphthol-7-sulphonic acid and two molecular proportions of metaphenylenediamine; it is then wrung out and dried. By diazotizing the fibre thus prepared and passing it through a bath of β-naphthol there are obtained red tints fast to washing and to rubbing. Red brown tints may be obtained by substituting a bath of caustic alkali for the β-naphthol.

Another procedure for using the dyestuffs of the type in question to produce fast tints on the fibre is as follows:—

The fibre is dyed with dyestuffs obtained by combining in an acid medium one molecular proportion of diazotized 2-naphthylamine-6-sulphonic acid and one molecular proportion of the ternary condensation product from one molecular proportion of cyanuric chloride, one molecular proportion of 2:5-aminonaphthol-7-sulphonic acid and two molecular proportions of metaphenylenediamine. There are obtained pale orange yellow tints which become intense red brown tints very fast to washing when treated with diazotized paranitraniline.

(f) Dyestuffs derived from intermediate products of the type f.

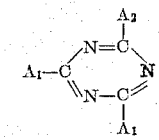

Example 19.

In 1000 parts of water containing 20 parts of anhydrous sodium carbonate are dissolved 35.3 parts of the ternary condensation product from one molecular proportion of cyanuric chloride, two molecular proportions of 2:5-aminonaphthol-7-sulphonic acid and one molecular proportion of monoacetylparaphenylenediamine. There is then added the diazo-compound prepared in the usual manner from 13.6 parts of meta-aminoformanilide. As soon as the diazo-compound has disappeared 40 parts of sulphuric acid of 50 per cent strength are added and the whole is heated to 80–90° C., whereupon the formyl groups are saponified. The mixture is then made alkaline by means of sodium carbonate and there is isolated the dyestuff corresponding most probably with the formula:

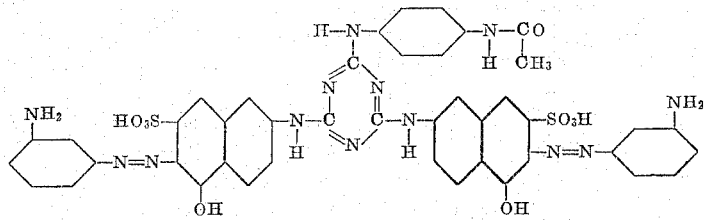

which dyes cotton bluish-red tints becoming by diazotization and development on the fibre with β-naphthol a slightly brownish red, very fast to washing. This dyestuff belongs in fact to the type b; in order to transform it into a dyestuff of the type f the solution is heated to ebullition for some time with addition of caustic soda of 10 per cent strength, which saponifies the acetyl group. The dyestuff of the type f thus obtained is distinguished clearly from the dyestuff of the type b from which it is derived by the fact that the red tints obtained on the fibre by diazotization and development with β-naphthol are notably more intense, more blue and more fast to washing.

If in this example the 2:5-aminonaphthol-7-sulphonic acid is exchanged for 1:8-aminonaphthol-3:6-disulphonic acid there are obtained dyestuffs notably more violet; it is clear also that the order of the use of the components may be varied at will for arriving equally at the dyestuffs of the type in question.

2.

*Dyestuffs derived from intermediate products not containing aminonaphthol residues.*

(g) Dyestuffs derived from intermediate products of the type g,

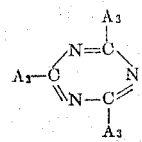

Example 20.

51 parts of the ternary condensation product obtained from one molecular proportion of cyanuric chloride, one molecular proportion of para-aminosalicylic acid, one molecular proportion of 1:4-phenylenediamine-3-sulphonic acid and one molecular proportion of aniline are diazotized with 6.9 parts of sodium nitrite and 25 parts of hydrochloric acid and the diazo-solution thus obtained is introduced into a solution of 20.8 parts of the hydrochloride of ethyl-β-naphthylamine. The hydrochloric acid is neutralized in proportion as it is formed by adding sodium acetate. As soon as the diazo-compound has completely disappeared the mixture is made alkaline with sodium carbonate and the dyestuff formed is isolated in the usual manner. It dyes cotton a vivid rose and wool red. By substituting β-naphthol or ethyl-benzyl-aniline for the ethyl-β-naphthylamine there are obtained dyestuffs tending more to orange. Thanks to their salicylic grouping they are all fitted to be fixed on the fibre by means of chromium salts.

By substituting in this example the ternary condensation product from one molecular proportion of cyanuric chloride, one molecular proportion of para-aminosalicylic acid, one molecular proportion of 1:4-phenylenediamine-3-sulphonic acid and one molecular proportion of sulphanilic acid on the one hand for the diazo compound, and on the other hand the secondary condensation product from one molecular proportion of cyanuric chloride, one molecular proportion of 1:8-aminonaphthol-3:6-disulphonic acid and one molecular proportion of para-aminosalicylic acid for the coupling component, there is obtained a dyestuff soluble in alkalies to a dark red solution and printing on cotton with chromium mordants a beautiful violet lake fast to washing.

There will be frequently found in the examples which follow types of the dyestuffs belonging to type g and playing the part of intermediate products so that for this type the characteristic product of the first two examples of the present example will suffice.

Example 21.

33 parts of the reduced condensation product from one molecular proportion of cyanuric chloride, one molecular proportion of nitrophenol, and two molecular proportions of diethylamine are diazotized in the usual manner and the diazo-solution is run into an aqueous alkaline solution of 28.8 parts of 1(6-chloro-3-sulpho)-phenyl-3-methyl-5-pyrazolone to which the necessary quantity of sodium acetate has been added. As soon as the coupling is completed, the dyestuff thus obtained corresponding most probably with the formula:

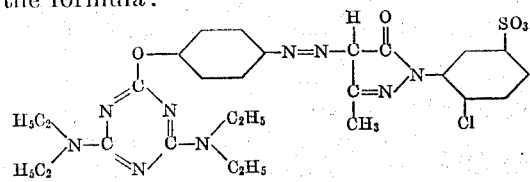

is thrown out by means of common salt. It dyes wool, clear greenish-yellow tints, very fast to washing, and light.

The same dyestuff is obtained if 10.9 parts of 1:4-aminophenol be diazotized, combined in the usual manner with 28.8 parts of 1(6-chloro-3-sulpho)-phenyl-3-methyl-5-pyrazolone, the dyestuff thus obtained being condensed in an aqueous solution with 18.5 parts of cyanuric chloride in the presence of 5.3 parts of sodium carbonate and 4 parts of caustic soda and the condensation product thus obtained boiled with 29.2 parts of diethylamine.

If in the above example the 1(6-chloro-3-sulpho)-phenyl-3-methyl-5-pyrazolone be exchanged for 1:4-naphtholsulphonic acid, red orange tints are obtained, whereas N-acetyl-1:8-aminonaphthol-3:6-disulphonic acid yields a bluish red dyestuff of good properties of fastness.

If finally the diazo-component of the dyestuff, prepared as indicated in the first paragraph of this example, be exchanged for the diazotized condensation product from one molecular proportion of cyanuric chloride, one molecular proportion of 1:3-phenylenediamine and two molecular proportions of hydrogen sulphide, dyestuffs of similar properties are obtained as for instance the dyestuff corresponding most probably with the formula:

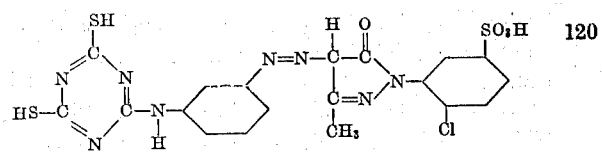

(h) Dyestuffs derived from intermediate products of the type

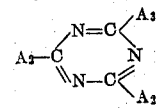

Example 22.

By means of 13.8 parts of sodium nitrite and 50 parts of hydrochloric acid of 30 per cent strength are tetrazotized 49 parts of the secondary condensation product from one molecular proportion of cyanuric chloride, two molecular proportions of 1:4-phenylenediamine-3-sulphonic acid and the tetrazo-compound thus obtained is introduced in 41.6 parts of the hydrochloride of ethyl-β-naphthylamine dissolved in 500 parts of water. The mineral acid in the solution is neutralized by means of sodium acetate. When the dyestuff has been completely formed the mixture is made alkaline with sodium carbonate and the dyestuff is salted out. It dyes cotton beautiful rose tints.

The same dyestuff corresponding most probably with the formula:

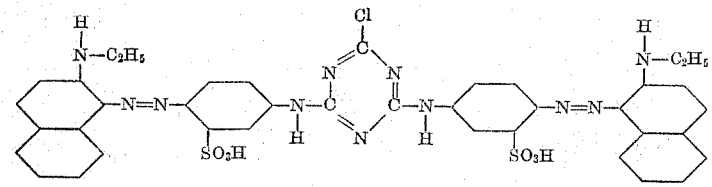

is obtained by causing to react on one molecular proportion of cyanuric chloride, two molecular proportions of the dyestuff obtained by reduction of the nitro-group of the dyestuff, itself made by coupling diazotized 1-amino-4-nitro-2-sulphonic acid with ethyl-β-naphthylamine. By substituting for the ethyl-β-naphthylamine another component there may be obtained dyestuffs yielding other tints; thus 1-phenyl-3-methyl-5-pyrazolone gives an orange, the anilide of aceto-acetic ester a greenish yellow.

All these dyestuffs still contain an atom of mobile chlorine which may be exchanged for example for an aniline residue by treating the dyestuffs as has already been explained in the preceding examples. In this manner there may be obtained dyestuffs slightly more reddish or more violet, also presenting an affinity still more marked for cotton.

This large class of dyestuffs may also be synthesized by tetrazotizing the ternary product of condensation from one molecular proportion of cyanuric chloride, two molecular proportions of 1:4-phenylenediamine-3-sulphonic acid and one molecular proportion of aniline and coupling with suitable components.

Thus, if 54.7 parts of the ternary product of condensation just mentioned are tetrazotized and the tetrazo-compound is mixed with an acid solution of 48.8 parts of 2:8-aminonaphthol-6-sulphonic acid there is obtained a dyestuff which dyes cotton rose tints fast to light.

Analogous dyestuffs which are generally a little more yellow may be made by using 1:3-phenylenediamine-4-sulphonic acid instead of 1:4-phenylenediamine-3-sulphonic acid.

Example 23.

33.8 parts of the ternary condensation product from one molecular proportion of cyanuric chloride, two molecular proportions of meta-toluene-diamine and one molecular proportion of ammonia are tetrazotized in the usual manner and the tetrazo-compound is introduced into a solution of 44 parts of 1-(3'-amino)-phenyl-5-pyrazolone-3-carboxylic acid in 500 parts of water and 40 parts of anhydrous sodium carbonate. As soon as coupling is complete the dyestuff corresponding most probably with the formula:

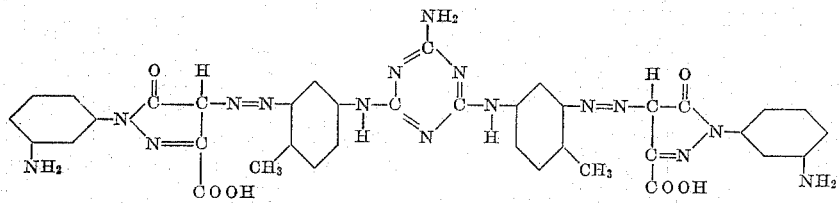

is isolated in the usual manner. It dyes cotton greenish yellow tints which by diazotization and development with 1-phenyl-3-methyl-5-pyrazolone become yellow, fast to washing and to light, while if the diazotized dyeing is developed with β-naphthol there is obtained an orange, fast to washing.

Example 24.

In 500 parts of water, 33 parts of the sodium salt of the dyestuff made by coupling 1-diazobenzene-3-sulphonic acid with ortho-anisidine are dissolved, and there are added 9.3 parts of finely subdivided cyanuric chloride and the whole is agitated for a certain time. There is then precipitated in the form of a yellow powder the primary condensation product (type g) from one molecular proportion of the monoazo-dyestuff with one molecular proportion of cyanuric chloride. Stirring is continued and the acid formed is carefully neutralized. The primary condensation product first dissolves, then the secondary condensation product from one molecular proportion of cyanuric chloride with two molecular proportions of the monoazo-dyestuff precipitates in its turn. It is filtered and dried. It dyes cotton greenish-yellow tints fast to light. The last atom of mobile chlorine in the dyestuff may be exchanged for any residue, such as, for example, that of ammonia, that of aniline or that of meta-aminoformanilide; in these latter cases there are obtained dyestuffs yielding tints slightly more reddish.

This method may also serve for synthesizing dyestuffs diazotizable on the fibre or capable of being developed with diazotized paranitraniline. Thus, if one dissolves 31.4 parts of the sodium salt of the dyestuff made by combining 1 molecular proportion of 1-diazobenzene-4-sulphonic acid with one molecular proportion of metaphenylenediamine in 1000 parts of water and adds 9.3 parts of finely subdivided cyanuric chloride while stirring and carefully adding sodium carbonate, the liquid being thus maintained substantially neutral, there is formed the secondary condensation product from one molecular proportion of cyanuric chloride with two molecular proportions of the aforesaid monoazo-dyestuff. This new dyestuff dyes cotton very orange yellow tints which become red brown fast to washing by diazotization and coupling with β-naphthol and a yellowish brown, equally fast to washing, by development with paranitrodiazobenzene.

Example 25.

34.6 parts of 1-aminobenzene-3-sulphonic acid are diazotized and the diazo-compound is introduced into a solution of the hydrochloride of 30.2 parts of the ternary condensation product from one molecular proportion of cyanuric chloride, two molecular proportions of metaphenylenediamine and one molecular proportion of ammonia. The combination is facilitated by neutralizing little by little the acid formed. The dyestuff, isolated in the usual manner, dyes cotton orange red tints, which become brown-yellow fast to washing by development with paranitrodiazobenzene, and yellowish bordeaux, equally fast to washing, by diazotization and development with β-naphthol.

While still within the present type, dyestuffs notably more complex may be prepared. Thus, by dissolving 35.7 parts of the dyestuff described in the preceding paragraph in 1000 parts of water and adding to this solution first 6.9 parts of sodium nitrite and then, between 5 and 10° C., 50 parts of hydrochloric acid of 30 per cent strength there is obtained a new tetrazo-compound, which is introduced into an aqueous solution containing 10.8 parts of metaphenylenediamine and 50 parts of anhydrous sodium carbonate. As soon as coupling is complete the new tetrakisazo dyestuff corresponding probably with the formula:

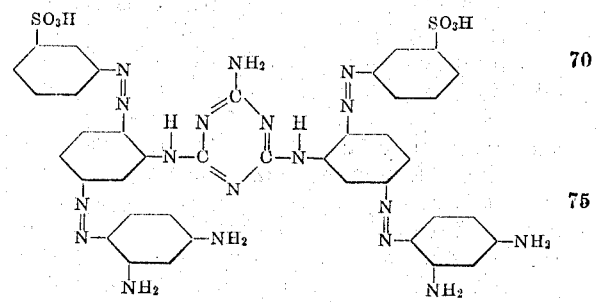

is isolated in the usual manner. It dyes cotton brown red tints which, under the influence of para-nitrodiazobenzene become blackish brown fast to washing. As another example 20.2 parts of 1-methyl-2:6-diaminobenzene-4-sulphonic acid may be tetrazotized in the usual manner and the product introduced into a solution of the hydrochloride from 60.4 parts of the ternary condensation product from one molecular proportion of cyanuric chloride, two molecular proportions of meta-phenylenediamine and one molecular proportion of ammonia in 1000 parts of water. The combination is facilitated by neutralizing little by little the hydrochloric acid. The dyestuff thus formed is then isolated in the usual manner. It dyes cotton directly orange tints, which when treated with diazotized paranitraniline become orange brown, fast to washing. By diazotization and development with β-naphthol it yields a yellowish bordeaux tint very fast to washing.

Example 26.

55 parts of the secondary condensation product from one molecular proportion of cyanuric chloride, two molecular proportions of 1(3'-amino)-phenyl-5-pyrazolone-3-carboxylic acid are dissolved in 200 parts of water and 50 parts of anhydrous sodium carbonate; ice is added and then the diazo compound prepared in the usual manner from 18.6 parts of aniline. There is formed a dyestuff which, when filtered and dried, is a yellow powder dyeing cotton pure yellow, fast to alkalies, to acids and to light, and capable of being discharged by hydrosulphite. This dyestuff still possesses an atom of mobile chlorine which can be exchanged for diverse residues. By exchanging the pyrazolone or the diazo-compound for others there may be obtained dyestuffs exhibiting other properties.

Example 27.

It has been pointed out both in the present specification and in the U. S. Patents Nos. 1,625,530, 1,625,531, 1,625,532, and 1,625,533, all filed July 20th, 1923, that the intermediate products made with the aid of cyanuric chloride, however great their molecules may be, have a very marked affinity for cotton and are on this account suited directly for the production of the dyestuffs on the fibre. Certain intermediate products of the type $h$ now under consideration are also highly suitable for this kind of dyeing. Thus if one dyes cotton with 2 per cent of its weight of the di-ternary condensation product obtained by action of two molecular proportions of aniline on the di-secondary condensation product, itself obtained by condensation of one molecular proportion of para-phenylenediamine with two molecular proportions of the primary condensation product from one molecular proportion of cyanuric chloride with one molecular proportion of the 1:3-phenylenediamine-4-sulphonic acid and tetrazotizes and develops with 1-phenyl-3-methyl-5-pyrazolone, which becomes fixed on the fibre, there is obtained an intense greenish yellow dyestuff very fast to washing and to light.

(i) Dyestuffs derived from intermediate products of the type $i$,

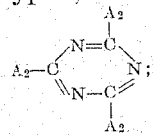

Example 28.

In about 1000 parts of water are dissolved 60.5 parts of the disodium salt of the ternary condensation product from one molecular proportion of cyanuric chloride, two molecular proportions of 1:4-phenylenediamine-3-sulphonic acid and one molecular proportion of meta-phenylenediamine. There are successively added 95 parts of hydrochloric acid of 30 per cent strength and 20.7 parts of sodium nitrite. The three amino-groups of the intermediate product are diazotized and the orange diazo-compound in part precipitated is introduced into an alkaline solution of 32.4 parts of meta-phenylenediamine. The triazo-dyestuff formed is isolated in the usual manner. It dyes cotton brownish-yellow tints which, treated with para-nitrodiazobenzene, become an intense reddish brown of very satisfactory fastness to washing.

By using in this example instead of the meta-phenylenediamine, resorcinol, there is obtained a dyestuff which yields orange tints, becoming more red and fast to washing by treatment with formaldehyde.

By substituting for the diazo-component of the preceding paragraph the diazotized ternary condensation product from one molecular proportion of cyanuric chloride with one molecular proportion of 1:4-phenylenediamine-3-sulphonic acid and two molecular proportions of meta-phenylenediamine there is obtained with metaphenylenediamine a dyestuff very similar to that of the first paragraph of this example, and giving on cotton brown yellow tints becoming fast to washing by treatment with formaldehyde; while with resorcinol there is obtained a dyestuff slightly more yellowish than that of the second paragraph of this example.

Example 29.

In 600 parts of water are dissolved 63.2 parts of the di-sodium salt of the ternary condensation product from one molecular proportion of cyanuric chloride with two molecular proportions of 1:4-phenylenediamine-3-sulphonic acid and one molecular proportion of meta-aminoformanilide. 70 parts of hydrochloric acid of 30 per cent strength and 13.8 parts of sodium nitrite are added. The tetrazo-compound thus prepared is introduced at 0° C. into an alkaline solution of 21.6 parts of metaphenylenediamine. The whole is stirred until coupling is finished and is then neutralized with a mineral acid; 50 parts of sulphuric acid of 50 per cent strength are added and the mixture is heated for about two hours at 90° C. The formyl group is thus saponified. The dyestuff corresponding most probably with the formula:

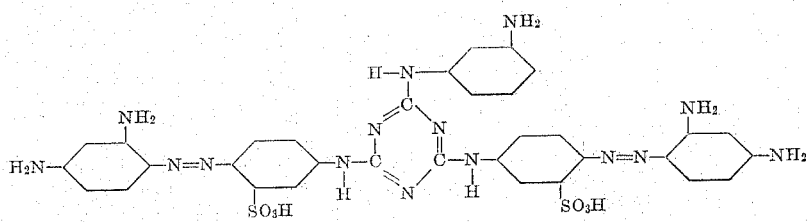

is then isolated in the usual manner by adding common salt to the liquid previously made alkaline, and filtering and drying. It dyes vegetable fibre brown yellow tints which become fast to washing by treatment with formaldehyde. Red brown tints also fast to washing are obtained either by treating the primary tints with para-nitrodiazobenzene or by diazotization and development with $\beta$-naphthol.

By substituting for the metaphenylene-diamine in this dyestuff resorcinol there is obtained a dyestuff yielding more orange tints which become fast to washing when treated with formaldehyde.

In 1000 parts of water are dissolved 55.8 parts of the sodium salt of the ternary condensation product from one molecular proportion of cyanuric chloride, one molecular proportion of 1:4-phenylenediamine-3-sulphonic acid and two molecular proportions of meta-aminoformanilide; 35 parts of hydrochloric acid of 30 per cent strength are added at a temperature between 0° and 3° C. and then 6.9 parts of sodium nitrite. The slightly soluble diazo-compound thus formed is introduced into an alkaline solution of 17.4 parts of 1-phenyl-3-methyl-5-pyrazolone, whereupon coupling occurs rapidly. When the latter is complete the two formyl groups are split off by heating in presence of sulphuric acid. The dyestuff thus obtained dyes vegetable fibre orange yellow tints which when diazotized and coupled on the fibre with β-naphthol yield a red orange fast to washing. By substituting β-naphthol for the 1-phenyl-3-methyl-5-pyrazolone there is obtained a bluish red dyestuff remaining bluish red when diazotized on the fibre and developed with β-naphthol.

*Example 30.*

A fine suspension of 18.6 parts of cyanuric chloride in 100 parts of water is prepared and there is added a solution of 33 parts of the sodium salt of the mono-azo dyestuff obtained by combining 1-diazobenzene-3-sulphonic acid with ortho-anisidine. The mixture is stirred for several hours in the course of which the primary condensation product deposits in the form of a yellow powder. 5 parts of sodium carbonate are added carefully and then 27.2 parts of meta-aminoformanilide dissolved in 300 parts of water and the mixture is stirred, first for several hours cold, and then for some time at 50° C. and afterwards for some hours at 90° C., while constantly keeping it nearly neutral by addition of sodium carbonate. As soon as the ternary condensation product from one molecular proportion of cyanuric chloride with one molecular proportion of the monoazo-dyestuff and two molecular proportions of meta-aminoformanilide has been formed there are added 40 parts of caustic soda of 30 per cent strength and the mixture is boiled for half an hour and the saponified dyestuff is isolated. It dyes cotton greenish yellow tints and yields on diazotization and development with 1-phenyl-3-methyl-5-pyrazolone a pure yellow color and by development with β-naphthol an orange color, both being fast to washing. In this example by using meta-toluylenediamine instead of meta-aminoformanilide the dyestuffs diazotized and developed on the fibre are orange brown with β-naphthol and are yellow with 1-phenyl-3-methyl-5-pyrazolone. Substitution of nitrometaphenylenediamine for the meta-aminoformanilide leads to dyestuffs of which the dyeings diazotized and developed on the fibre are orange with β-naphthol and orange yellow with 1-phenyl-3-methyl-5-pyrazolone.

*Example 31.*

18.4 parts of benzidine are tetrazotized in the usual manner and the tetrazo-compound thus obtained is introduced into a solution containing 48 parts of the disodium salt of the ternary product of condensation from one molecular proportion of cyanuric chloride, one molecular proportion of 1:3-phenylenediamine-4-sulphonic acid and two molecular proportions of metaphenylene-diamine. As soon as the intermediate product has formed and the tetrazo-body has disappeared, there is added a solution of 10.8 parts of metaphenylene-diamine. The dyestuff thus formed corresponding most probably with the formula:

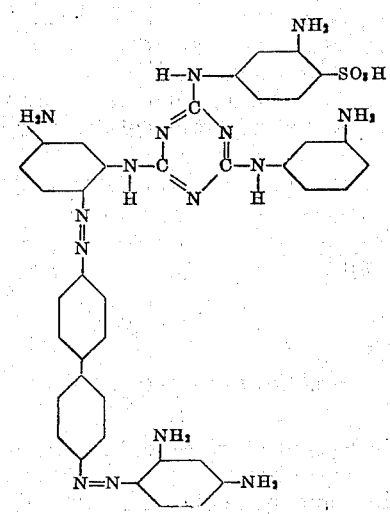

dyes cotton brown red becoming brown yellow fast to washing by treating with paranitrodiazobenzene and brownish violet very fast to washing by diazotization and coupling on the fibre with β-naphthol.

It is to be understood that in all these examples the cyanuric chloride may be exchanged for other halides of cyanuric acid comprising their derivative in which the halogen of the cyanuric halides has already been in part exchanged for any residues.

Again the present invention is not limited either by the examples hereinbefore contained or by the possibilities which the combinations among themselves of the reactions described or mentioned in connection with the different types of the numerous examples which have been given may suggest.

What we claim is:—

1. Process for the manufacture of new azo dyestuffs which contain the cyanuric nucleus, consisting in condensing a cyanuric halide with components which have reactive hydrogen atoms attached to one of a group of metalloids comprising O, S, and N, of which components at least one contains the azo group.

2. As new products the herein described azo dyestuffs which contain the cyanuric nucleus, and which correspond with the general formula

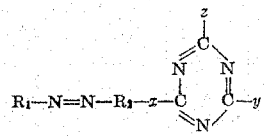

wherein $R_1$ and $R_2$ represent aromatic nuclei which may carry any substituents, and wherein $x$ is one of a group of connecting links consisting of NH, O or S, and wherein $y$ and $z$ are one of a group of metalloids comprising O, S, N and Cl and which may be linked to hydrogen or radicals which may take its place, which dyestuffs form powders more or less intensively colored, dissolving in water to solutions of all colors of the spectrum and of those which are obtained by combination of the said colors, and dyeing the textile fiber similar tints.

3. As new products the herein described azo dyestuffs which contain the cyanuric nucleus, and which correspond to the general formula wherein $R_1$ and $R_2$ represent aromatic nuclei which may carry any substituents, and wherein $y$ and $z$ are one of a group of metalloids comprising O, S, N and Cl, and which may be linked to hydrogen or radicals which may take its place, which dyestuffs form powders more or less intensively colored, dissolving in water to solutions of all colors of the spectrum and of those which are obtained by combination of the said colors, and dyeing the textile fiber similar tints.

4. As new products the herein described azo dyestuffs which contain the cyanuric nucleus, and which correspond with the general formula

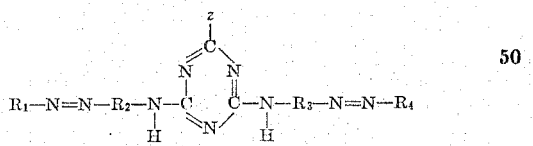

wherein $R_1$, $R_2$, $R_3$ and $R_4$ represent any aromatic nuclei which may carry any substituents, and wherein $z$ is one of a group of metalloids comprising O, S, N and Cl and which may be linked to hydrogen or radicals which may take its place, which dyestuffs form powders more or less intensively colored, dissolving in water to solutions of all colors of the spectrum, and of those which are obtained by combination of the said colors, and dyeing the textile fiber similar tints.

In witness whereof we have hereunto signed our names this 5th day of December, 1923.

HERMANN FRITZSCHE.
EDUARD KRUMMENACHER.
HANS GUBLER.
OTTO KAISER.